Nov. 3, 1931.  E. PLEASANCE  1,830,130
WORK SUPPORTING ARBOR
Filed Dec. 19, 1927
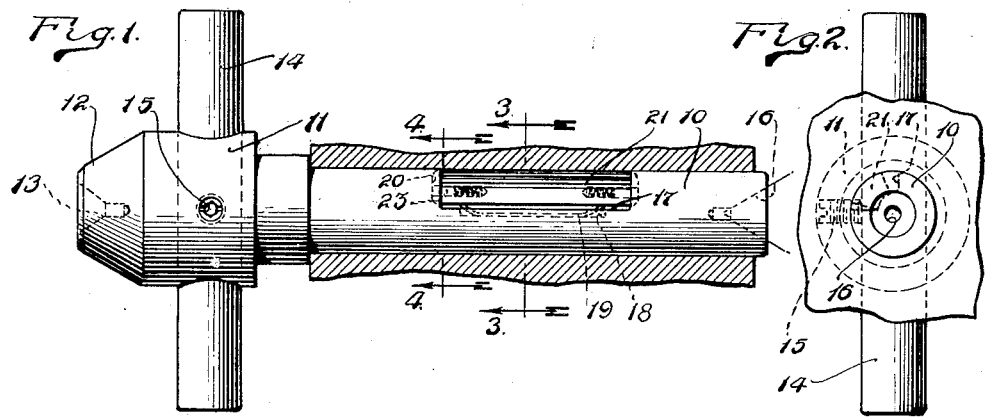
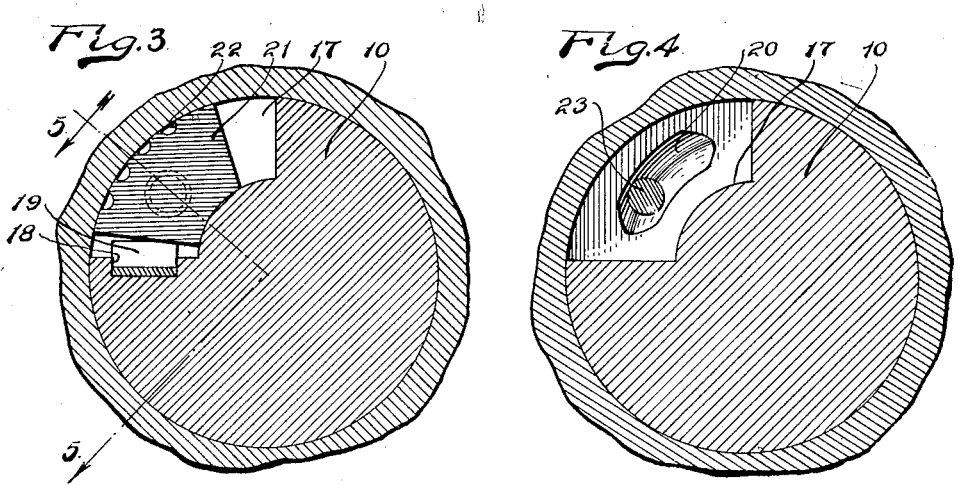
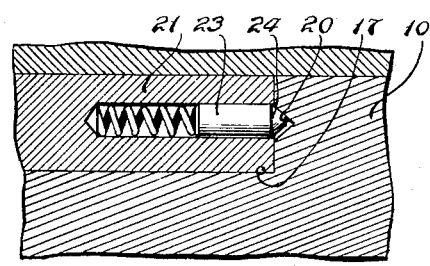
Inventor
Edwin Pleasance
By Nilton Tibbets
Attorney Patented Nov. 3, 1931

1,830,130

UNITED STATES PATENT OFFICE

EDWIN PLEASANCE, OF DETROIT, MICHIGAN, ASSIGNOR TO PACKARD MOTOR CAR COMPANY, OF DETROIT, MICHIGAN, A CORPORATION OF MICHIGAN

WORK SUPPORTING ARBOR

Application filed December 19, 1927. Serial No. 241,044.

This invention relates to lathes and more particularly to work supporting arbors.

An object of the invention is to provide an arbor for supporting bored work pieces without injury to the wall defining the bore.

Another object of the invention is to provide an arbor having means for gripping the wall defining the bore in a work piece in a manner to prevent slipping of the work piece.

Another object of the invention is to provide an arbor for work pieces having a locking member with a substantial area of bearing surface for engaging the wall defining the bore in the work piece.

Another object of the invention is to provide an arbor for work pieces having a locking member movable eccentrically to the center of the arbor.

Yet another object of the invention is to provide an arbor for supporting bored work pieces having means for locking the work piece upon the arbor so that it may be easily and quickly mounted or demounted.

A further object of the invention is to provide an arbor for supporting bored work pieces and to construct the same so that the amount of required machine operation on the parts during manufacture shall be materially reduced.

A still further object of the invention is to provide an arbor for supporting work pieces having a locking member with a positive action devoid of any injurious effect, an arbor which is highly efficient in operation and yet of marked simplicity as a whole and in respect to each of its component parts, so that its manufacture is economically facilitated both as regards to parts and their assembly.

Further objects of the invention will appear from the following description taken in connection with the drawings which form a part of this specification, and in which:

Figure 1 is a side elevation of an arbor with a work piece thereon, the work piece being shown in section, Figure 2 is an end elevation of the arbor with the work piece supported thereon, Figure 3 is a sectional view taken on line 3—3, Fig. 1, Figure 4 is a sectional view taken on line 4—4, Fig. 1, and Figure 5 is an enlarged detail view.

Referring to the drawings for more specific details of the invention, 10 represents an arbor having on one end thereof a head 11 provided with a frusto-conical portion 12 centered as indicated at 13 and a diametral bore in which is positioned a driving pin 14 secured in place by a set screw 15. This head is positioned so that the center 13 engages the live center in a lathe spindle, not shown, with the driving pin engaging the driver. The other end of the arbor is centered as indicated at 16 for the reception of a tail stock center shown diagrammatically. It is, of course, to be understood that means other than those shown and above described might well be employed for mounting and rotating the arbor.

The body of the arbor is provided with a longitudinal slot 17, the end walls of which are normal to each other and parallel to diametral planes through the arbor intersecting at an angle of ninety degrees. The side walls of the slot are in planes normal to the axis of the arbor and the bottom of the slot is defined by an arc of a circle, the center of which is eccentric to the axis of the arbor. In other words, the slot is of segmental form of decreasing depth. In the end wall having the greater depth is a slot 18 in which is positioned a flat spring 19, the object of which will hereinafter appear, and the side walls are provided with arcuate V-shaped slots 20 parallel to the bottom of the slot 17, the respective ends of the slots 20 being tapered in depth.

A segmental member 21 of decreasing cross section and of a smaller angle than the angle of the slot 17 is positioned in the slot 17 and is adapted to slide freely therein. This segmental member has a concave arcuate bottom coinciding with the bottom of the slot 17 and a top which conforms to an arc of a circle having a radius equal to the radius of the arbor and this top is provided with serrations or transverse grooves 22 providing an adequate gripping surface. In each end of the member 21 is a bore having mounted therein a spring pressed plunger 23 formed with a conical end portion 24 adapted to engage the slots 20 to retain the segmental member within the slot 17 and yet permit movement thereof. The larger end of the segmental member bears upon the spring 19 which urges the member toward the end of the slot having the smallest depth. In other words, the segmental member urged by the spring will slide in the slot on the eccentric bottom thereof causing the segmental member to move outwardly from the center of the arbor.

In operation, the arbor is inserted in the bore of the work piece to be turned by rotating the work piece backwardly while the arbor is being inserted until the work piece abuts the shoulder on the arbor. During this operation the segmental member is moved backwardly and depresses the spring upon which it is seated, permitting a free backward rotation of the work piece. The work piece is then rotated forwardly whereupon the segmental member is urged forward by the spring and outwardly by the eccentric bottom of the slot upon which it slides. This outward movement of the segmental member causes the face thereof to engage the wall defining the bore in the work piece and to grip the same, the gripping action being aided and enhanced by the serrations or grooves on the face of the segmental member. This segmental member functions as a wedge between the bottom of the slot which is eccentric to the center of the arbor and the wall defining the bore in the work piece, hence, the work piece will be securely locked upon the arbor without injury to the wall defining the bore.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim is new and desire to secure by Letters Patent is:

1. An arbor comprising a cylindrical member having a peripheral slot, the bottom of which is defined by an arc of a circle, the center of which is eccentric to the axis of the member, an arcuate member having a tapering cross section positioned in the slot, said arcuate member having serrations upon one face thereof, spring means for urging the arcuate member toward the small end of the slot and resiliently mounted means for retaining the arcuate member within the slot.

2. An arbor comprising a cylindrical member having a peripheral slot, the bottom of which is eccentric to the axis of the member and the side walls of which are provided with arcuate grooves, an arcuate member having a tapering cross-section movable in the slot, and resiliently mounted means engaging the arcuate grooves in the side walls of the slot for retaining the arcuate member in the slot.

3. An arbor comprising a cylindrical member having a peripheral slot, the bottom of which is eccentric to the axis of the member, an arcuate member having a tapering cross-section movable in the slot, and means for retaining the arcuate member within the slot, said means comprising a member adapted for frictional engagement of the arcuate member and the arbor.

4. An arbor comprising a cylindrical member having a peripheral slot, the bottom of which is eccentric to the axis of the member and having arcuate V-shaped grooves in the side walls thereof, an arcuate member having a tapering cross-section movable in the slot, and spring pressed plunger means extending from the side walls of the arcuate member and engaging in the arcuate V-shaped grooves in the side walls forming the peripheral slot, said spring pressed plungers telescoping inwardly of the arcuate member permitting removal thereof from the cylindrical member.

5. An arbor comprising a cylindrical member having a peripheral slot, the bottom of which is eccentric to the axis of the member, and the side walls of which are formed with arcuate V-shaped grooves tapering toward their ends, an arcuate member having a tapering cross-section movable in the slot, and spring pressed plunger means extending from the side walls of the arcuate member and engaging in the arcuate groove in the side walls forming the peripheral slot.

6. An arbor comprising a cylindrical member having a peripheral slot, the bottom of which is eccentric to the axis of the member, an arcuate member having a tapering cross-section movable in the slot, spring means for urging the arcuate member toward the small end of the slot, and retaining means for the ends of the arcuate member comprising axially movable plungers.

In testimony whereof I affix my signature.

EDWIN PLEASANCE.